(12) United States Patent
Oishi

(10) Patent No.: US 11,841,074 B2
(45) Date of Patent: Dec. 12, 2023

(54) TRANSMISSION MECHANISM

(71) Applicant: SANKYO SEISAKUSHO CO., Tokyo (JP)

(72) Inventor: Atsushi Oishi, Kikugawa (JP)

(73) Assignee: SANKYO SEISAKUSHO CO., Tokyo (JP)

( * ) Notice: Subject to any disclaimer, the term of this patent is extended or adjusted under 35 U.S.C. 154(b) by 0 days.

(21) Appl. No.: 17/782,547

(22) PCT Filed: Nov. 24, 2020

(86) PCT No.: PCT/JP2020/043602
§ 371 (c)(1),
(2) Date: Jun. 3, 2022

(87) PCT Pub. No.: WO2021/111922
PCT Pub. Date: Jun. 10, 2021

(65) Prior Publication Data
US 2023/0003294 A1 Jan. 5, 2023

(30) Foreign Application Priority Data
Dec. 6, 2019 (JP) .................. 2019-220893

(51) Int. Cl.
*F16H 57/04* (2010.01)
*F16H 25/04* (2006.01)
(52) U.S. Cl.
CPC .......... *F16H 57/0409* (2013.01); *F16H 25/04* (2013.01); *F16H 57/0406* (2013.01); *F16H 57/0412* (2013.01); *F16H 57/0471* (2013.01)

(58) Field of Classification Search
CPC .. F16H 57/0497; F16H 57/0406; F16H 1/166; F16H 57/0471; F16N 2270/24; F16N 2210/12; F16N 7/12
See application file for complete search history.

(56) References Cited

U.S. PATENT DOCUMENTS 5,769,543 A * 6/1998 Tsukada ................ F16C 29/086
384/15
5,772,333 A * 6/1998 Yabe ..................... F16C 29/086
384/15
(Continued)

FOREIGN PATENT DOCUMENTS

CN 208764249 U 4/2019
JP S62-266264 A 11/1987
(Continued)

OTHER PUBLICATIONS

International Search Report of the International Search Authority issued in PCT/JP2020/043602, dated Dec. 22, 2020; ISA/JP.

*Primary Examiner* — Jake Cook
(74) *Attorney, Agent, or Firm* — Harness, Dickey & Pierce, P.L.C.

(57) ABSTRACT

A transmission mechanism includes a housing, a first rotating member accommodated in the housing and rotatable about a first rotating member axis, and a lubricating member accommodated in the housing and containing a lubricant. While the first rotating member rotates about the lubricating member, the lubricating member applies a preload to and comes into contact with a part of the first rotating member on the basis of an elastic force, so that the part of the first rotating member is lubricated with the lubricant.

13 Claims, 16 Drawing Sheets

(56) References Cited

U.S. PATENT DOCUMENTS

| | | | |
|---|---|---|---|
| 11,371,601 B2* | 6/2022 | Suzuki | F16C 19/547 |
| 2001/0010176 A1* | 8/2001 | Tsukada | F16H 57/0497 |
| | | | 74/89.44 |
| 2008/0019620 A1* | 1/2008 | Vierheilig | F16H 57/0497 |
| | | | 384/13 |

FOREIGN PATENT DOCUMENTS

| | | | |
|---|---|---|---|
| JP | 2005-331075 A | 12/2005 | |
| JP | 2010-196733 A | 9/2010 | |
| JP | 2014-101989 A | 6/2014 | |
| WO | WO-2019/150881 A1 | 8/2019 | |

* cited by examiner (a)   (b)

(c)   (d)

(e)   (f)

TRANSMISSION MECHANISM

CROSS-REFERENCE TO RELATED APPLICATIONS

This application is a 371 U.S. National Phase of International Application No. PCT/JP2020/043602 filed on Nov. 24, 2020, which claims the benefit of priority from Japanese Patent Application No. 2019-220893 filed on Dec. 6, 2019. The entire disclosures of all of the above applications are incorporated herein by reference.

TECHNICAL FIELD

The present invention relates to a transmission mechanism capable of efficiently lubricating a rotating member with a small amount of lubricant.

BACKGROUND ART

A cam mechanism as an example of a transmission mechanism is a mechanism in which a cam having a cam rib serving as one shaft is engaged with a bearing fixed to a rotating member as the other shaft, whereby power is transmitted while one shaft of the cam and the rotating member is used as an input shaft and the other shaft is used as an output shaft. By adjusting the inter-axis distance between the input shaft and the output shaft, a preload is generated on the contact surface between the bearing and the cam, and backlash between the input and output can be eliminated. The contact of the bearing with the cam causes friction between the bearing and the cam, so that the bearing and cam wear.

Patent Literature 1 discloses a rotation transmission mechanism including a motor, a gear driven by the motor, a lubricant for cooling the gear, and lubricant storage means for storing the lubricant and immersing the gear in the lubricant. The gear includes a first spur gear, a second spur gear, a driven shaft, a worm gear (or a roller gear cam), a worm wheel (or a turret around which a plurality of bearings engaging with the roller gear cam are arranged radially and at equal intervals), and a rotating shaft. The lubricant is stored in the lubricant storage means so that the first spur gear, the second spur gear, and the worm gear are completely immersed in the lubricant. Heat generated from the motor is transferred to the gear, and the transferred heat is transferred to the lubricant in which the gear is immersed, thereby cooling the gear.

CITATION LIST

Patent Literature

PATENT LITERATURE 1: JP-A-2014-101989

SUMMARY OF INVENTION

Technical Problem

In the rotation transmission mechanism of Patent Literature 1, the lubrication of the gear is performed by the lubricant stored in the lubricant storage means. However, when the gear is driven by the motor and the turret rotates through the roller gear cam, there is a problem that the lubricant moves in a direction away from the roller gear cam and the turret due to centrifugal force, so that the contact surface between the bearing and the cam is put into a state where no lubricant-based membrane remains on the contact surface. Further, when a large amount of the lubricant is stored in the lubricant storage means, there is a problem that the stirring resistance of the lubricant increases and heat is generated. Still further, when the lubricant storage means has been filled with the lubricant, it causes a problem that the lubricant may leak out of the lubricant storage means.

Therefore, in order to solve the above problems, an object of the present invention is to provide a transmission mechanism to be lubricated with lubricant by applying a preload based on an elastic force.

Solution to Problem

According to one aspect of the present invention, a transmission mechanism including a housing and a first rotating member that is accommodated in the housing and is rotatable about a first rotating member axis further includes a lubricating member that is accommodated in the housing and contains lubricant, and the lubricating member comes into contact with a part of the first rotating member while applying a preload based on an elastic force during rotation of the first rotating member with respect to the lubricating member, thereby lubricating the part of the first rotating member with the lubricant.

According to a specific example of the present invention, in the transmission mechanism, the lubricating member includes an absorbent member impregnated with the lubricant.

According to a specific example of the present invention, in the transmission mechanism, the lubricating member includes an elastic material, and applies the preload to the part of the first rotating member based on an elastic force of the lubricating member itself.

According to a specific example of the present invention, the transmission mechanism further includes an elastic member, and the elastic member presses the lubricating member against the part of the first rotating member based on an elastic force, whereby the lubricating member applies the preload to the part of the first rotating member.

According to a specific example of the present invention, in the transmission mechanism, the lubricating member deforms the lubricating member itself to circulate the lubricant in the lubricating member by applying the preload to the part of the first rotating member.

According to a specific example of the present invention, in the transmission mechanism, the lubricating member absorbs heat from the first rotating member by contact with the first rotating member, and transfers the heat to the housing.

According to a specific example of the present invention, in the transmission mechanism, the lubricating member adsorbs dust from the first rotating member by contact with the first rotating member.

According to a specific example of the present invention, in the transmission mechanism, the lubricating member adsorbs dust of which a particle size decreases according to a distance from a contact portion thereof with the first rotating member.

According to a specific example of the present invention, in the transmission mechanism, at least one groove is provided at the contact portion of the lubricating member with the first rotating member.

According to a specific example of the present invention, in the transmission mechanism, the lubricating member is detachable from the housing.

According to a specific example of the present invention, the transmission mechanism further includes a second rotating member that is rotatable about a second rotating member axis, wherein rotation of one of the first rotating member and the second rotating member enables rotation of the other of the first rotating member and the second rotating member by contact between the first rotating member and the second rotating member, and in order to lubricate contact portions of the first rotating member and the second rotating member with the lubricant during rotation of the first rotating member and the second rotating member, when a part of the first rotating member is not in contact with the second rotating member, the lubricating member comes into contact with the part of the first rotating member while applying a preload based on an elastic force, thereby lubricating the part of the first rotating member with the lubricant.

According to a specific example of the present invention, in the transmission mechanism, the first rotating member includes a plurality of bearings along a rotation direction thereof, and the lubricating member comes into contact with a bearing being in no contact with the second rotating member among the plurality of bearings while applying a preload based on an elastic force, thereby lubricating the bearing being in no contact with the second rotating member with the lubricant.

According to a specific example of the present invention, in transmission mechanism, the lubricating member comes into contact with the bearing being in no contact with the second rotating member while applying preloads based on elastic forces in two directions, thereby lubricating the bearing being in no contact with the second rotating member with the lubricant.

According to a specific example of the present invention, in the transmission mechanism, a portion of the first rotating member excluding the plurality of bearings does not come into contact with the lubricating member.

According to a specific example of the present invention, in the transmission mechanism, the bearing is a cam follower, a roller follower, or a ball, and the second rotating member has a shape that can engage with the bearing.

Advantageous Effects of Invention

According to the present invention, the lubricating member comes into contact with a part of the rotating member while applying a preload to the part of the rotating member based on an elastic force during rotation of the rotating member with respect to the lubricating member, so that the rotating member can be efficiency lubricated with a small amount of lubricant.

Other objects, features and advantages of the present invention will become apparent from the following description of the embodiments of the present invention taken in conjunction with the accompanying drawings.

DESCRIPTION EMBODIMENTS

Figure 1:
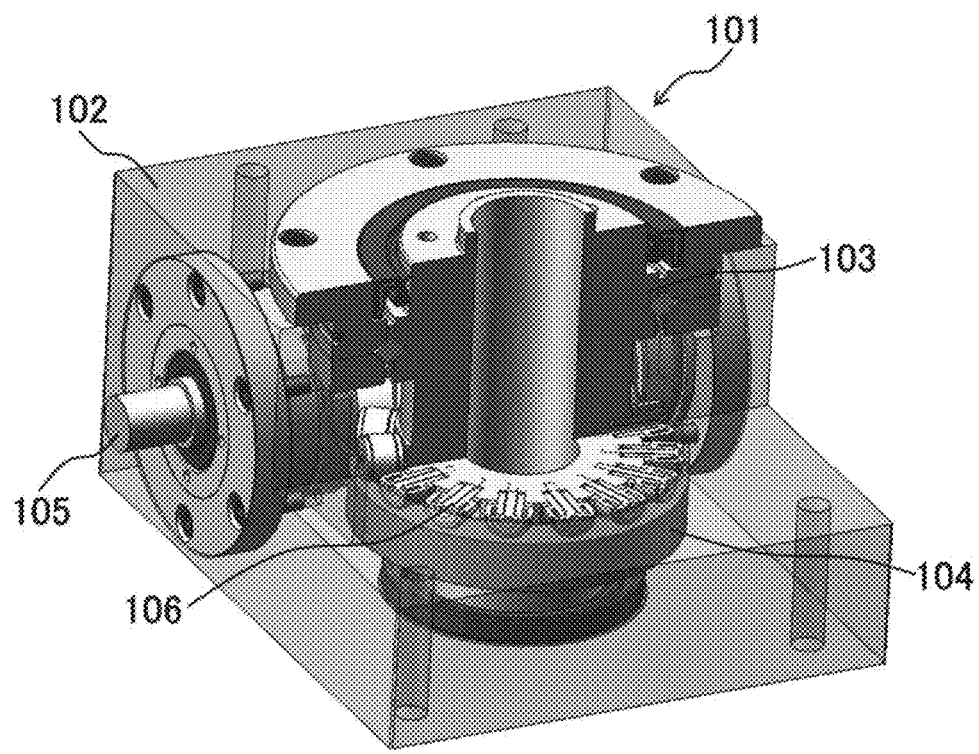
FIG. 1 is a perspective view which partially transparently shows a partial cross section of a transmission mechanism according to an embodiment of the present invention.
Figure 2:
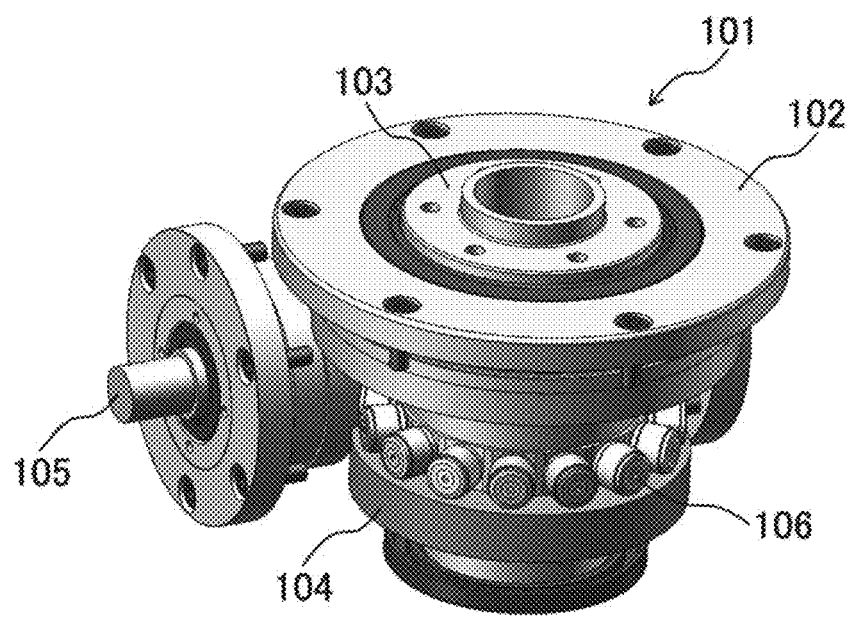
FIG. 2 is a perspective view showing the inside of the transmission mechanism of FIG. 1.
Figure 3:
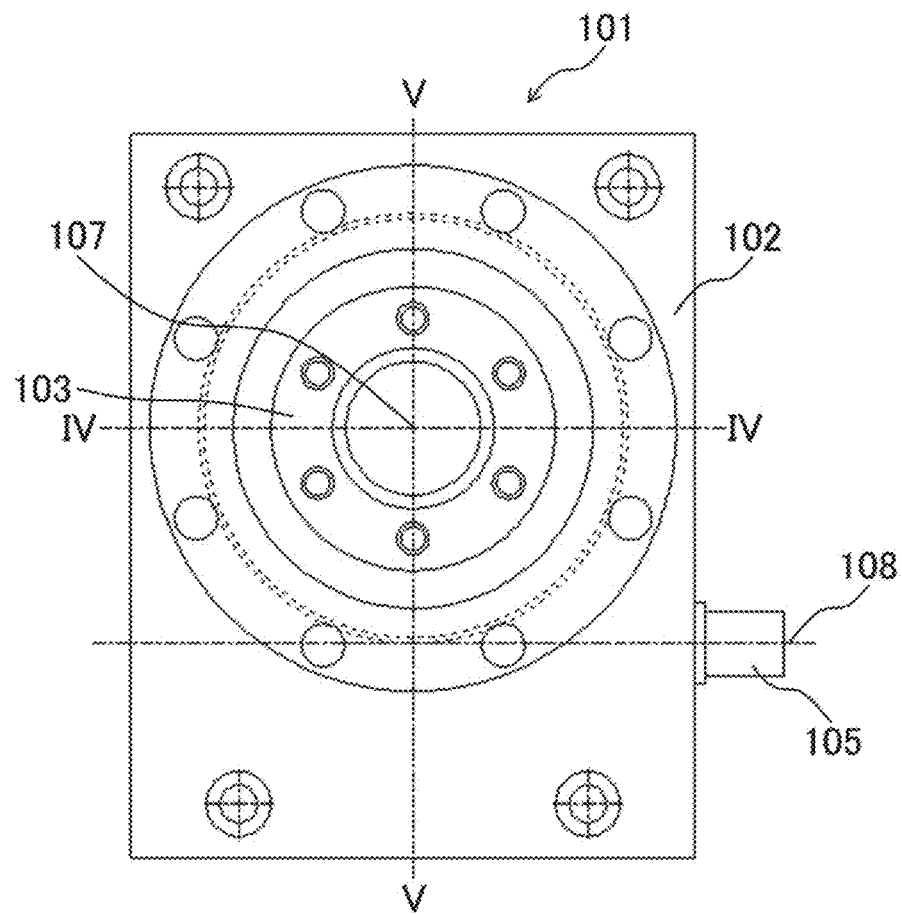
FIG. 3 is a top view of the transmission mechanism of FIG. 1.
Figure 4:
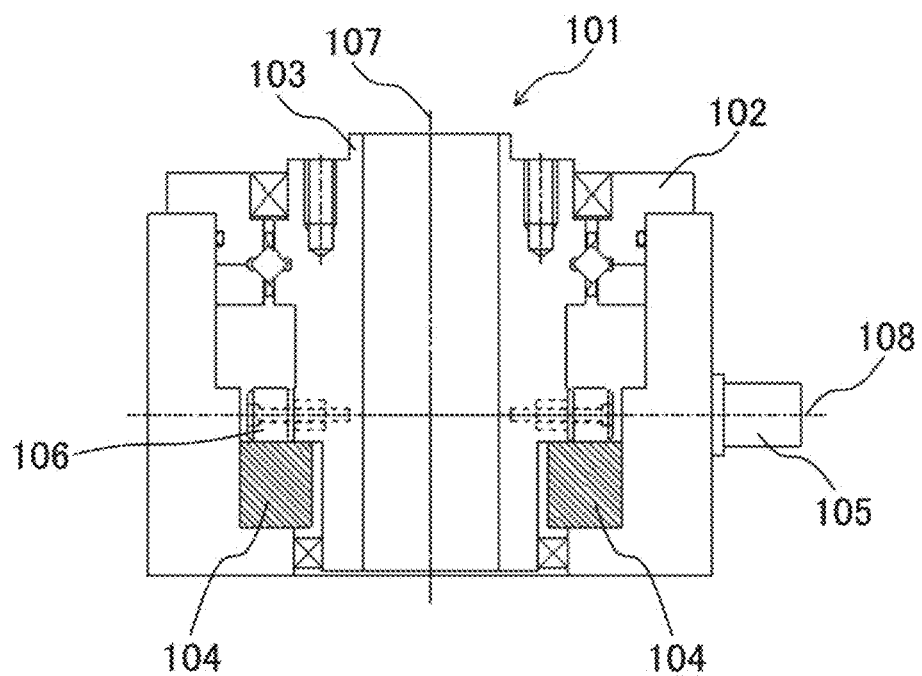
FIG. 4 is a cross-sectional view of the transmission mechanism of FIG. 1 which is taken along line IV-IV of FIG. 3.
Figure 5:
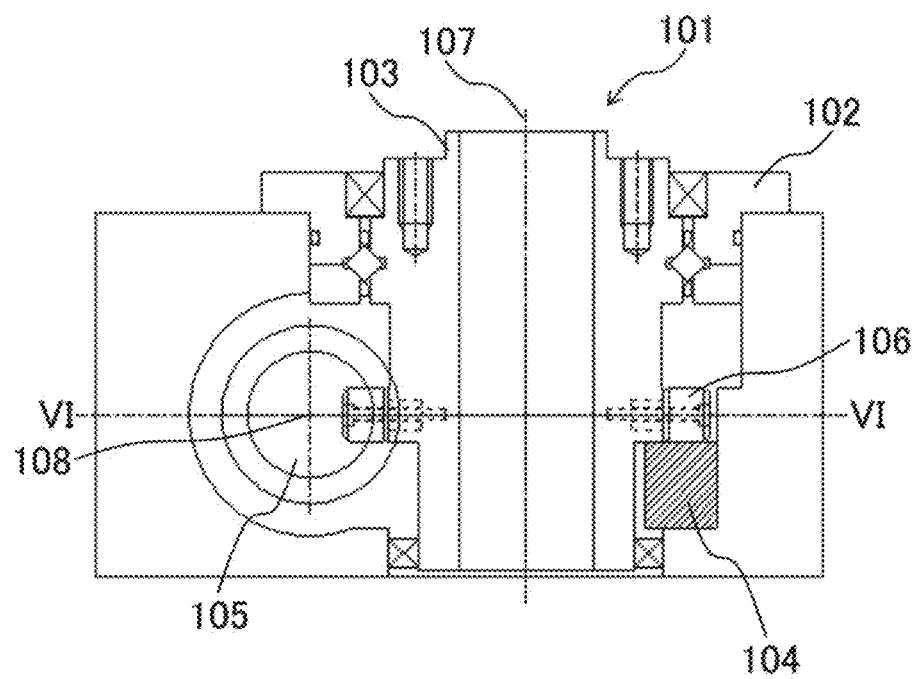
FIG. 5 is a cross-sectional view of the transmission mechanism of FIG. 1 which is taken along line V-V of FIG. 3
Figure 6:
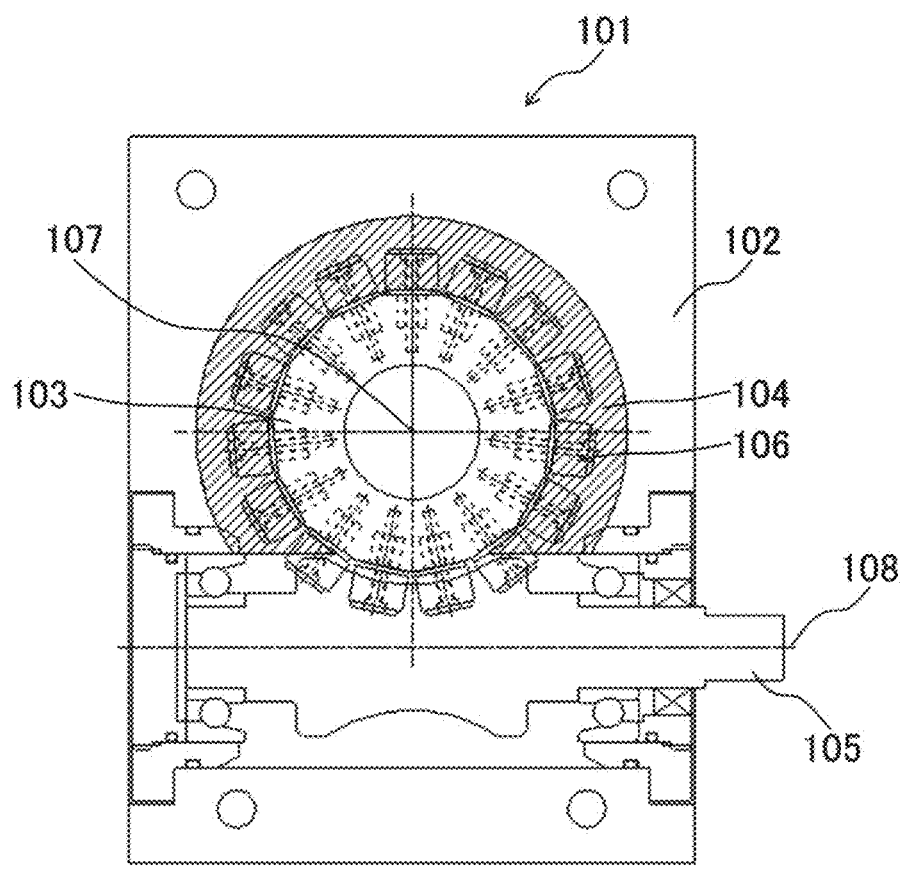
FIG. 6 is a cross-sectional view of the transmission mechanism of FIG. 1 which is taken along line VI-VI of FIG. 5.
Figure 7:
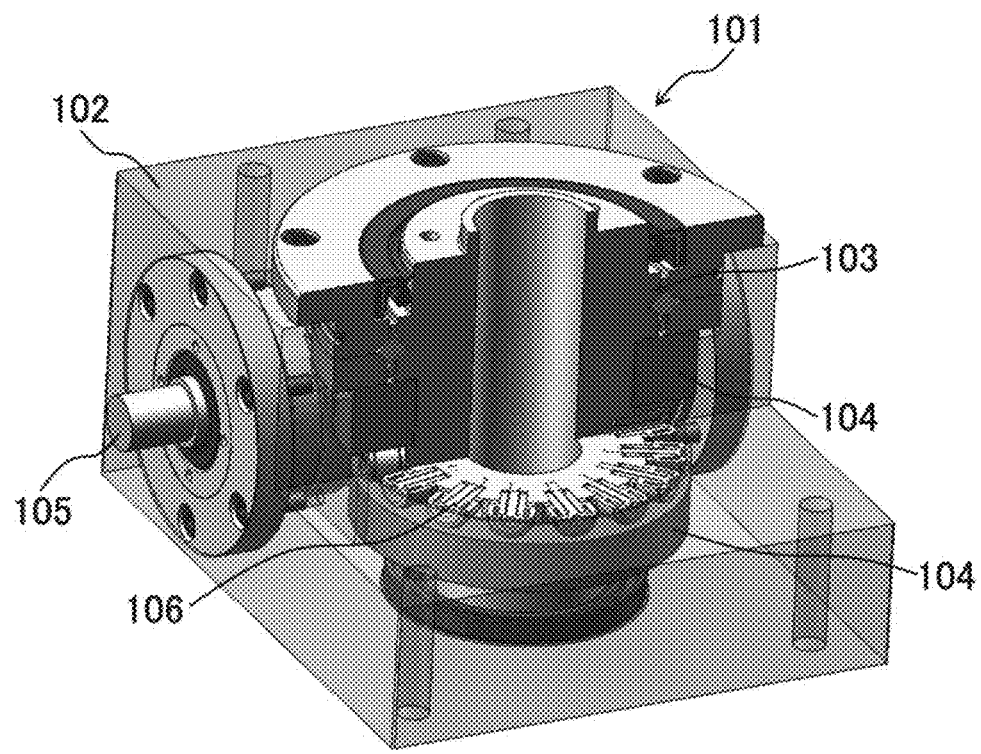
FIG. 7 is a perspective view which partially transparently shows a partial cross section of a transmission mechanism as another embodiment of the present invention.
Figure 8:
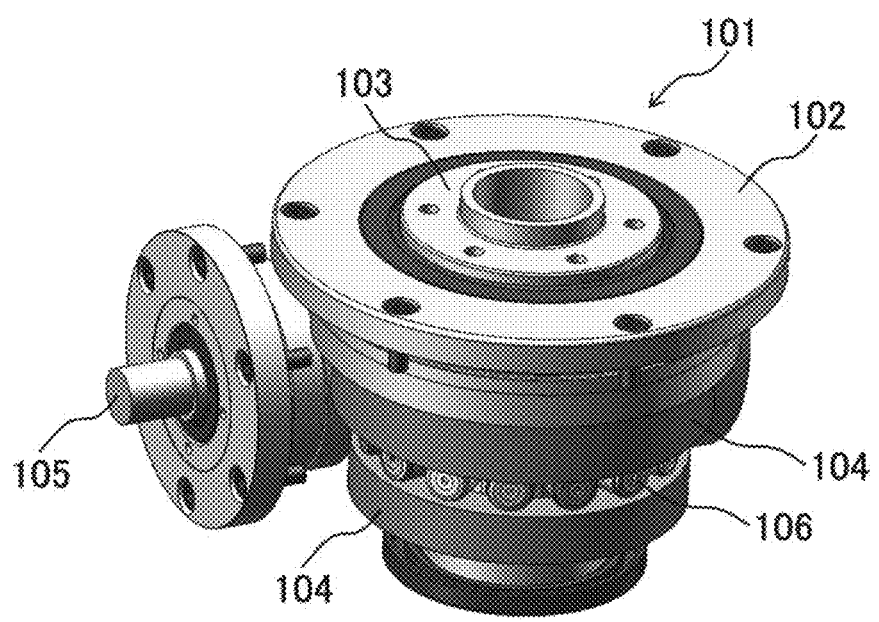
FIG. 8 is a perspective view showing the inside of the transmission mechanism of FIG. 7.
Figure 9:
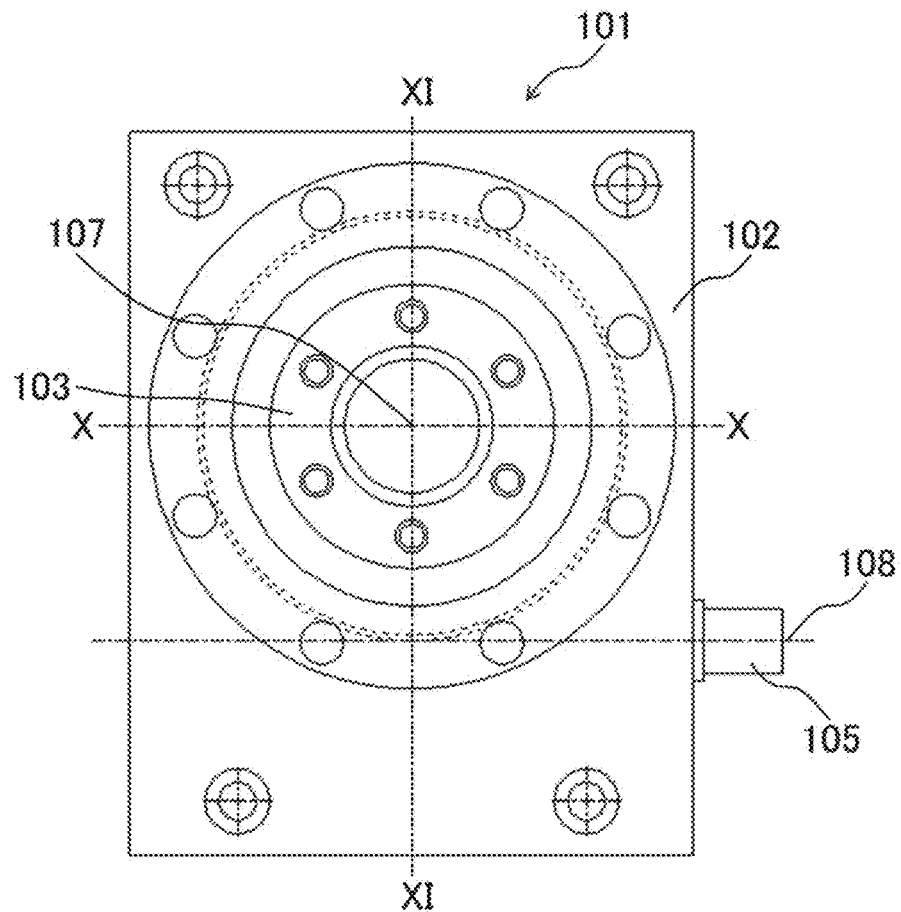
FIG. 9 is a top view of the transmission mechanism of FIG. 7.

Embodiments according to the present invention will be described with reference to the drawings. However, the present invention is not limited to those embodiments.

Various embodiments of a transmission mechanism 101 will be described with reference to FIGS. 1 to 29. The transmission mechanism 101 includes a housing 102, and a first rotating member 103 which is accommodated in the housing 102 and is rotatable about a first rotating member axis 107. The transmission mechanism 101 further includes a lubricating member which is accommodated in the housing 102 and contains lubricating member 104. The lubricating member 104 is fixed to the housing 102. While the first rotating member 103 rotates about the first rotating member axis 107 with respect to the lubricating member 104, the lubricating member 104 comes into contact with a part of the first rotating member 103 while applying a preload to the part of the first rotating member 103 based on an elastic force, whereby the lubricating member 104 coat the lubricant on the part of the first rotating member 103 to lubricate the part of the first rotating member 103 with the lubricant.

In order to suppress heat to be generated due to friction caused by the contact between the first rotating member 103 and the lubricating member 104, the elastic force may be adjustable so that the lubricating member 104 applies an appropriate preload to the first rotating member 103. For example, the elastic force may be adjusted so that the preload decreases when the first rotating member 103 rotates at high speed with respect to the lubricating member 104, whereas the preload increases when the first rotating member 103 rotates at low speed with respect to the lubricating member 104. By rotating the first rotating member 103 with respect to the lubricating member 104 while applying a preload, it is possible to efficiently secure a lubricant-based membrane on the first rotating member 103 with a small amount of lubricant contained in the lubricating member 104 and lubricate the first rotating member 103, so that abrasion of the first rotating member 103 can be suppressed. Further, since the amount of the lubricant can be reduced to the minimum, an environmental load can be reduced, so that the risk of leakage of the lubricant can be reduced. The lubricant may have a cleaning action, and the lubricant can remove dust which is caused by abrasion and adheres to the first rotating member 103, and enables the first rotating member 103 to rotate efficiently. Further, the lubricant may have a cooling action, and the lubricant can lower the temperature of the first rotating member 103, and enables the first rotating member 103 to rotate efficiently.

The first rotating member 103 may include bearings 106 as a component for transmitting power. While the bearings 106 rotate about the first rotating member axis 107 with respect to the lubricating member 104, the lubricating member 104 comes into contact with the bearings 106 passing across the lubricating member 104 while applying a preload to the bearings 106 based on an elastic force, whereby the lubricating member 104 coats the lubricant on the outer surfaces of the bearings 106 to lubricate the bearings 106 with the lubricant. The bearings 106 pass longer across the lubricating member 104 along the direction of rotation of the first rotating member 103, whereby the lubricating member 104 can more efficiently coat the lubricant on the outer surfaces of the bearings 106, and enables the bearings 106 to be lubricated with the lubricant. Any member may be used as the lubricating member 104 as long as it can lubricate the bearings 106 with lubricant while the bearings 106 rotate about the first rotating member axis 107 with respect to the lubricating member 104, and it may be located below the bearings 106 in the axial direction of the first rotating member axis 107 as shown in FIGS. 1 to 6, or may be located above the bearings 106 in the axial direction. Further, as shown in FIGS. 7 to 11, the lubricating members 104 may be located on both the lower and upper sides of the bearings 106 respectively in the axial direction of the first rotating member axis 107, whereby the lubricating members 104 more efficiently coat the lubricant on the outer surfaces of the bearings 106 to lubricate the bearings 106 with the lubricant. Depending on the arrangement of the bearings 106, the lubricating member 104 may be located outside or inside the bearings 106 in the radial direction of the rotation of the first rotating member 103 about the first rotating member axis 107, or may be located both inside and outside the bearings 106 in the radial direction.

Any member may be used as the first rotating member 103 as long as it can transmit power, and for example, it may include a gear. The lubricating member 104 comes into contact with a tooth portion of the gear passing across the lubricating member 104 while applying a preload to the tooth portion based on an elastic force, whereby the lubricating member 104 coats the lubricant on the tooth portion to lubricate the tooth portion with the lubricant.

The lubricant contained in the lubricating member 104 may include at least one of a liquid lubricant, a semi-solid lubricant, a solid lubricant, a liquid crystal lubricant, and a gel-like lubricant. For example, the lubricant may be grease, oil, or the like. The lubricant contained in the lubricating member 104 can be selected as needed. The lubricating member 104 may include an absorbent member such as a porous material impregnated with lubricant. The absorbent member may be, for example, a member having high absorbency for lubricant, such as sponge or felt.

The lubricating member 104 may be configured such that the lubricating member 104 itself is an elastic material. The lubricating member 104 comes into contact with a part of the first rotating member 103 while applying a preload to the part of the first rotating member 103 based on the elastic force of the lubricating member 104 itself, whereby the lubricating member 104 coats the lubricant on the part of the first rotating member 103 to lubricate the part of the first rotating member 103 with the lubricant. The lubricating member 104 can be installed in an existing dead space of the transmission mechanism 101. Further, the transmission mechanism 101 may further include an elastic member. The elastic member is arranged, for example, between the housing 102 and the lubricating member 104, and the lubricating member 104 is pressed against a part of the first rotating member 103 based on the elastic force of the elastic member. The lubricating member 104 comes into contact with a part of the first rotating member 103 while applying a preload to the part of the first rotating member 103 based on the pressing force of the elastic member, thereby coating the lubricant on the part of the first rotating member 103, so that the part of the first rotating member 103 is lubricated with the lubricant. The elastic member can also be installed in an existing dead space of the transmission mechanism 101.

The lubricating member 104 may deform itself by applying a preload to a part of the first rotating member 103 to circulate the lubricant inside the lubricating member 104. As described above, the first rotating member 103 includes components for transmitting power such as the bearings 106 and the tooth portion, and the lubricating member 104 can deform itself as if it undulates due to the preload based on the elastic force each time each component passes across the lubricating member 104. This deformation causes a pumping action in the lubricating member 104, and the lubricant can circulate inside the lubricating member 104. By circulating the lubricant, the lubricant can be efficiently coated on a part of the first rotating member 103 to lubricate the part of the first rotating member 103.

The lubricating member 104 may absorb heat from the first rotating member 103 by its contact with the first rotating member 103, and transfer the heat to the housing 102. Although the first rotating member 103 generates heat due to its rotation for transmitting power, the lubricating member 104 may have a cooling action for absorbing the generated heat by its contact with the first rotating member 103 and transmitting the absorbed heat by its contact with the housing 102. Since the heat generated by the first rotating member is dissipated to the outside of the transmission mechanism 101 via the lubricating member 104 and the housing 102, the lubricating member 104 can lower the temperature of the first rotating member 103, and enables the first rotating member 103 to rotate efficiently. Further, as described above, the lubricant circulates inside the lubricating member 104, thereby enhancing the cooling action of the lubricating member 104 on the first rotating member 103.

Heat conduction and convection occur with the lubricant as a medium in the lubricating member 104 due to heat generated in the transmission mechanism 101, and the generated heat is dissipated from the housing 102 to the atmosphere via the lubricant. In the lubricating member 104, as the convection of the lubricant, forced convective heat transfer by stirring which is caused by rotation of the first rotating member 103 around the first rotating member axis 107 occurs in addition to natural convective heat transfer. In the forced convection, the heat transfer coefficient of the medium is higher as the viscosity of the medium is lower. Therefore, a lubricant having a lower viscosity (for example, a lubricant having fluidity, a liquid lubricant) can be more expected as a lubricant having a cooling effect by forced convection, and it is preferable as a medium. However, since even such lubricant has a lower heat conductivity than steel, nonferrous metal, resin, and the like, it may be difficult to dissipate heat from the transmission mechanism 101. Further, since the heat transfer coefficient is affected by the heat conductivity and surface area of the medium, in order to increase the heat transfer coefficient, the medium should be made thinner, the surface area of the medium should be increased, and a medium having excellent heat conduction should be selected. It is preferable that the first rotating member 103 is efficiently cooled and further cooled with a small amount of lubricant. However, when the amount of lubricant is small and the following contaminants such as dust intervene, the degree of contamination of the lubricant tends to increase, so it is necessary to take measures against the contaminants, and it is also important to consider that the cooling effect of forced convection by stirring is not impaired. Therefore, in order not to impair the cooling effect of forced convection by stirring, it may be considered to adopt a lubricating member 104 that secures a minimum space for cooling the first rotating member 103 in the housing 102, adopt a lubricating member 104 having such a high heat conductivity (material (steel, nonferrous metal, resin, and the like), shape, and the like) and/or adopt a lubricating member 104 having a cleaning action on contaminants. In this way, an optimum lubricating member 104 can be adopted by selecting lubricant to be contained in the lubricating member 104, the material, shape, and the like of the lubricating member 104 for containing the lubricant. Further, by making the amount of lubricant small, maintenance such as refueling and waste oil treatment is economical, and it is expected that the environmental load will be reduced.

The lubricating member 104 may adsorb dust from the first rotating member 103 by its contact with the first rotating member 103. Although the first rotating member 103 generates dust due to abrasion when transmitting power, the lubricating member 104 may have a cleaning action for adsorbing dust through the contact between the first rotating member 103 and the lubricating member 104. Since the dust from the first rotating member 103 is adsorbed on the lubricating member 104, the lubricating member 104 can reduce the abrasion of the first rotating member 103, and enables the first rotating member 103 to efficiently rotate. Further, the maintenance cycle of the transmission mechanism 101 can be extended, and the life of the transmission mechanism 101 can be extended. Further, as described above, the lubricant circulates inside the lubricating member 104, whereby the cleaning action on dust in the lubricating member 104 can be enhanced.

The lubricating member 104 may adsorb dust having small particle sizes according to the distance from a portion thereof in contact with the first rotating member 103. The lubricating member 104 may have a pre-filtration function of adsorbing dust having a large particle size at a portion close to the portion in contact with the first rotating member 103, and adsorbing dust whose particle size gradually decreases as the distance from the portion in contact with the first rotating member 103 increases. For example, the lubricating member 104 includes a porous material impregnated with lubricant, and may be configured so that the sizes of pores of the porous material are coarse at a portion close to the portion in contact with the first rotating member 103, and gradually decrease as the distance from the portion in contact with the first rotating member 103 increases.

At least one groove may be provided at the portion of the lubricating member 104 that is in contact with the first rotating member 103. While the first rotating member 103 rotates about the first rotating member axis 107 with respect to the lubricating member 104 by the groove, the lubricating member 104 can change the preload to be applied to a part of the first rotating member 103 based on the elastic force thereof, and accumulate dust in the groove, so that the groove can enhance the cleaning action on the dust in the lubricating member 104.

The lubricating member 104 may be detachable from the housing 102. The contact of the lubricating member 104 with the first rotating member 103 reduces the lubricant in the lubricating member 104. However, the lubricating member 104 can be detached from the housing 102, replenished with lubricant, and then accommodated in the housing 102, or can be replaced by a new lubricating member 104 to be accommodated in the housing 102. Further, the lubricating member 104 is clogged due to adsorbing dust from the first rotating member 103. However, the lubricating member 104 can be detached from the housing 102, washed, and then accommodated in the housing 102 again, or can be replaced by a new lubricating member 104 to be accommodated in the housing 102.

Figure 10:
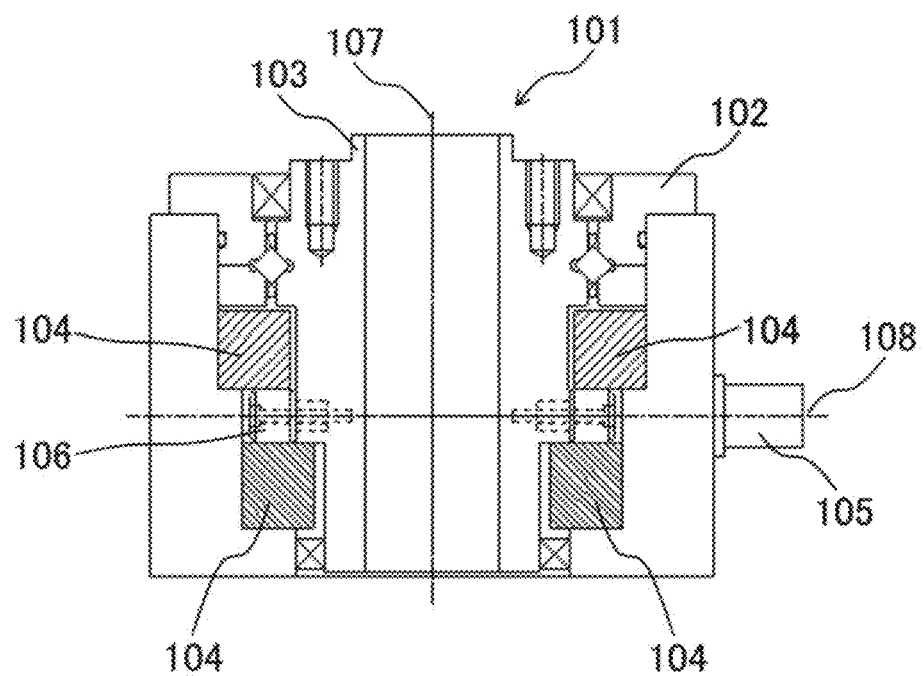
FIG. 10 is a cross-sectional view of the transmission mechanism of FIG. 7, which is taken along line X-X of FIG. 9
Figure 11:
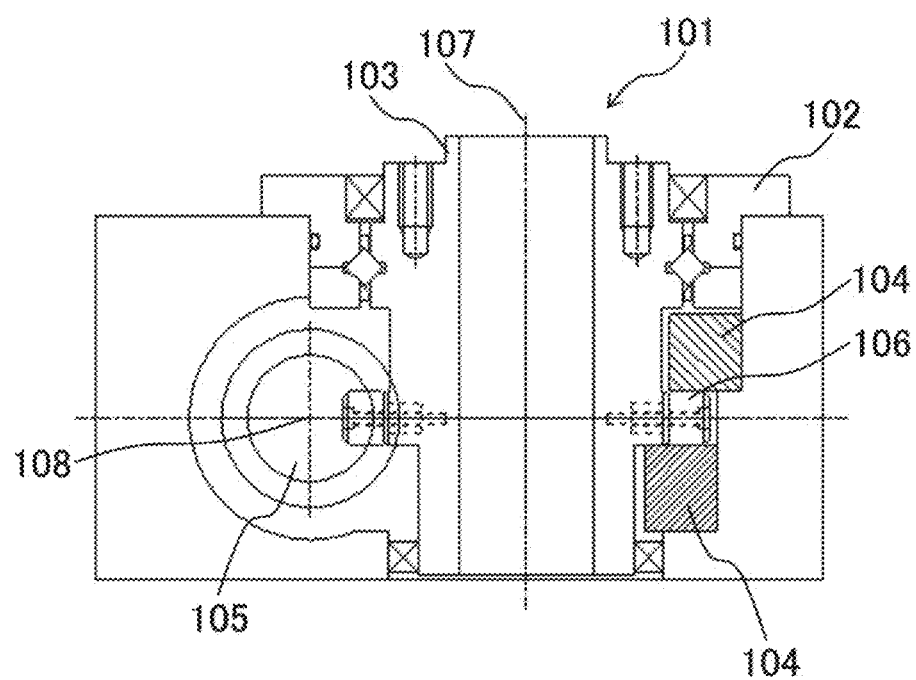
FIG. 11 is a cross-sectional view of the transmission mechanism of FIG. 7 which is taken along line XI-XI of FIG. 9.
Figure 12:
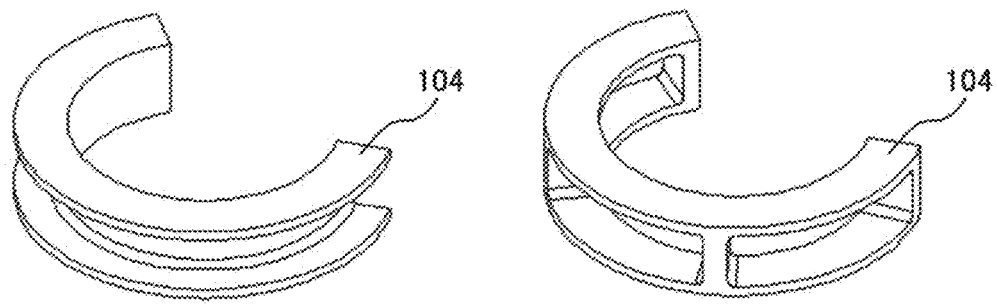
FIG. 12 is a perspective view of various shapes of a lubricating member in the transmission mechanism of the present invention.
Figure 12:
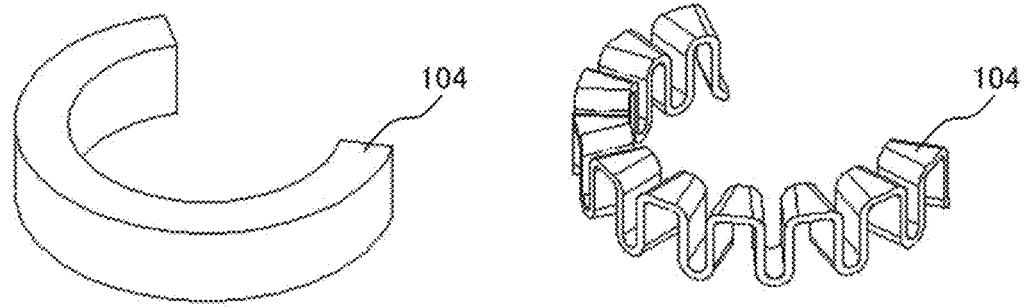
Figure 12:
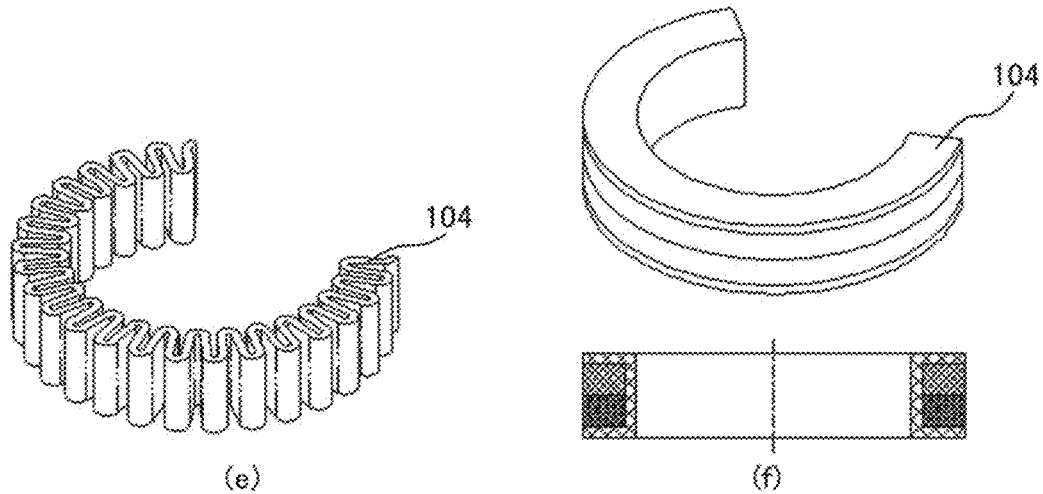

As shown in FIG. 12, the lubricating member 104 may have various shapes according to the magnitude of a preload, a direction in which the preload is applied, the size of a space in which the lubricating member 104 is arranged, the property of a material to be used for the lubricating member 104, the amount of heat to be absorbed from the first rotating member 103, the size and/or amount of dust from the first rotating member 103, and the like. For example, the lubricating member 104 may have a substantially U-shaped cross-section as shown in (a) when the lubricating member 104 is deformed by a minute preload, may have a shape in which a reinforcing portion having a substantially U-shaped cross-section is added as shown in (b) as the preload increases, or may be an integrated type having a substantially rectangular cross-section as shown in (c). The lubricating member 104 included in the transmission mechanism 101 of FIGS. 1 to 11 is an integrated type having a substantially rectangular cross-section as shown in (c). Further, the lubricating member 104 may be an axial flow type as shown in (d) when the lubricating member 104 is stable because the load change caused by the displacement in the axial direction is little, and a valley serving as a pool of lubricant is provided at a portion to be in contact with the first rotating member 103, or may be a depth-pleated type (radial flow type) as shown in (e) when the lubricating member 104 is shaped such that dust is easily adsorbed by the flow in the rotation direction of the first rotating member 103. Further, the lubricating member 104 may be a multi-layered type as shown in (f) when dust having large particle sizes is adsorbed at a portion close to the portion in contact with the first rotating member 103, and dust having small particle sizes are adsorbed at a portion far from the portion in contact with the first rotating member 103.

The transmission mechanism 101 further includes a second rotating member 105 rotatable about a second rotating member axis 108. Through the contact between the first rotating member 103 and the second rotating member 105, the rotation of one of the first rotating member 103 and the second rotating member 105 enables the rotation of the other of the first rotating member 103 and the second rotating member 105. For example, when the second rotating member 105 is rotated as an input shaft, the contact between the first rotating member 103 and the second rotating member 105 causes the first rotating member 103 as an output shaft to rotate. Further, when the first rotating member 103 is rotated as an input shaft, the contact between the first rotating member 103 and the second rotating member 105 causes the second rotating member 105 as an output shaft to rotate. In order to lubricate the contact portions between the first rotating member 103 and the second rotating member 105 with lubricant during the rotation of the first rotating member 103 and the second rotating member 105, when a part of the first rotating member 103 is not in contact with the second rotating member 105, the lubricating member 104 comes into contact with the part of the first rotating member 103 while applying a preload the part of the first rotating member 103 based on an elastic force, whereby the lubricating member 104 coats the lubricant on the part of the first rotating member 103 to lubricate the part of the first rotating member 103.

When the part of the first rotating member 103 which has been lubricated with the lubricant while the part of the first rotating member 103 is not in contact with the second rotating member 105 comes in contact with the second rotating member 105 due to the rotation of the first rotating member 103 about the first rotating member axis 107, the contact portions of the first rotating member 103 and the second rotating member 105 can be lubricated with lubricant, so that it is possible to suppress the abrasion caused by the contact between the first rotating member 103 and the second rotating member 105.

The second rotating member 105 generates heat due to its rotation for transmitting power, and the generated heat is transferred to the second rotating member 105 by the contact between the first rotating member 103 and the second rotating member 105. The lubricating member 104 may have a cooling action of absorbing the transferred heat by its contact with the first rotating member 103 and transferring the absorbed heat to the housing 102. Since the heat generated by the second rotating member 105 is dissipated to the outside of the transmission mechanism 101 via the first rotating member 103, the lubricating member 104, and the housing 102, the lubricating member 104 can reduce the temperatures of the first rotating member 103 and the second rotating member 105, and enables the first rotating member 103 and the second rotating member 105 to rotate efficiently. Further, as described above, the lubricant circulates inside the lubricating member 104, which makes it possible to enhance the cooling action of the lubricating member 104 on the first rotating member 103 and the second rotating member 105.

The lubricating member 104 may have a cleaning action in which dust adhering to the first rotating member 103 due to the abrasion caused by the contact between the first rotating member 103 and the second rotating member 105 is adsorbed by its contact with the first rotating member 103. Since the dust caused by the contact between the first rotating member 103 and the second rotating member 105 is adsorbed by the lubricating member 104, the lubricating member 104 can suppress the abrasion of the first rotating member 103 and the second rotating member 105, and enables the first rotating member 103 and the second rotating member 105 to rotate efficiently. In addition, the lubricating member 104 can extend the maintenance cycle of the transmission mechanism 101, and also extend the life of the transmission mechanism 101. Further, as described above, the lubricant circulates inside the lubricating member 104, so that the cleaning action on dust in the lubricating member 104 can be enhanced.

The first rotating member 103 may include a plurality of bearings 106 along the direction of rotation thereof, and the second rotating member 105 may have a shape that can engage with the plurality of bearings 106. The first rotating member 103 may include a gear having a tooth portion along the direction of rotation thereof, and the second rotating member 105 may have a shape that can engage with the tooth portion. During the rotation of the first rotating member 103 about the first rotating member axis 107 with respect to the lubricating member 104, some of the plurality of bearings 106 are in contact with the second rotating member 105, whereas the bearings 106 that are not in contact with the second rotating member 105 passes across the lubricating member 104. All of the bearings 106 that are not in contact with the second rotating member 105 may pass across the lubricating member 104, and some of the bearings 106 that are not in contact with the second rotating member 105 may pass across the lubricating member 104. By increasing the number of bearings passing across the lubricating member 104 among the bearings which are not in contact with the second rotating member 105, the lubricating member 104 can more efficiently coat the lubricant on the outer surfaces of the bearings 106, and lubricate the bearings 106 with the lubricant. The lubricating member 104 shown in FIG. 12 has a shape which is partially chipped on the circumference thereof, and the second rotating member 105 is provided at the chipped portion. Since all of the bearings 106 that are not in contact with the second rotating member 105 pass across the lubricating member 104, the lubricating member 104 can more efficiently coat the lubricant on the outer surfaces of the bearings 106 and lubricate the bearings 106 with the lubricant.

The lubricating member 104 comes into contact with the bearings 106 being in no contact with the second rotating member 105 while applying a preload to the bearings 106 based on an elastic force, whereby the lubricating member 104 coat the lubricant on the bearings 106 which are not in contact with the second rotating member 105, and lubricate the bearings 106 being in no contact with the second rotating member 105 with the lubricant. As shown in FIGS. 1 to 6, the lubricating member 104 may come into contact with the bearings being in no contact with the second rotating member 105 while applying a preload to the bearings based on an elastic force in one direction, thereby lubricating the bearings 106 being in no contact with the second rotating member 105 with the lubricant, or as shown in FIGS. 7 to 11, the lubricating member 104 may come into contact with the bearings 106 being in no contact with the second rotating member 105 while applying preloads to the bearings 106 based on elastic forces in two directions, whereby the lubricating member 104 coats the lubricant on the bearings 106 which are not in contact with the second rotating member 105, thereby lubricating the bearings 106 being in no contact with the second rotating member 105 with the lubricant. In the transmission mechanism 101 of FIGS. 7 to 11, the lubricating members 104 are located below and above the bearings 106 respectively in the axial direction of the first rotating member axis 107, and come into contact with the bearings 106 being in no contact with the second rotating member 105 while applying preloads to the bearings 106 based on elastic forces in two directions from the lower side and the upper side in the axial direction of the first rotating member axis 107, whereby the lubricating members 104 coat the lubricant on the bearings 106 being in no contact with the second rotating member 105 to lubricate the bearings 106 being in no contact with the second rotating member 105 with the lubricant. Further, depending on the arrangement of the bearings 106, the lubricating members 104 may be located outside and inside the bearings 106 in the radial direction of the rotation of the first rotating member 103 about the first rotating member axis 107, and come into contact with the bearings 106 being in no contact with the second rotating member 105 while applying preloads to the bearings 106 based on elastic forces in two directions from the outside and inside of the bearings 106 in the radial direction of the first rotating member axis 107, whereby the lubricating members 104 coat the lubricant on the bearings 106 being in no contact with the second rotating member 105 to lubricate the bearings 106 being in no contact with the second rotating member 105 with the lubricant. By arranging the bearings 106 in a space closed by the lower and upper or outer and inner lubricating members 104, the bearings 106 can be efficiently lubricated with the lubricant. Further, the lower and upper lubricating members 104 may be connected to each other, and the lubricating members 104 on the outside and the inside may also be connected to each other. Further, the lower and upper (or outer and inner) lubricating members 104 may be of the same type, and the lower and upper (or outer and inner lubricating members 104 may be of different types as shown in FIGS. 10 and 11.

Figure 13:
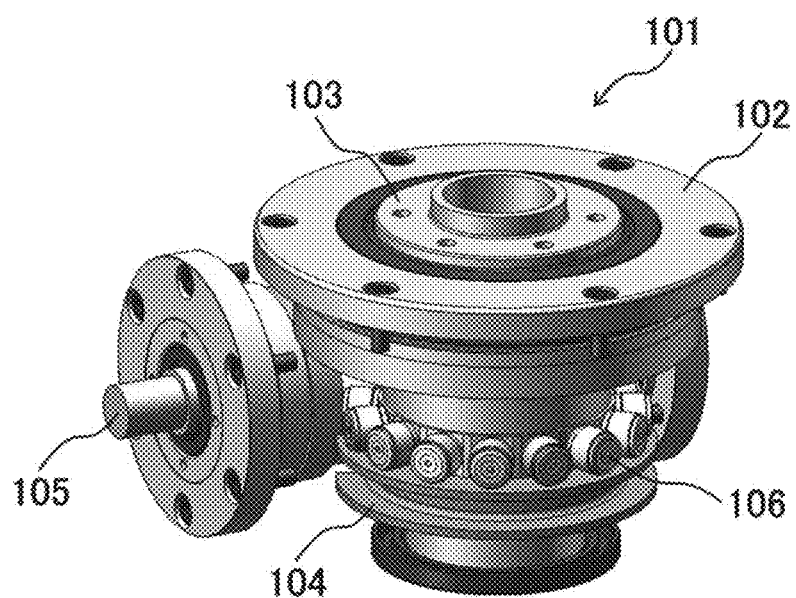
FIG. 13 is a perspective view showing the inside of a transmission mechanism as another embodiment of the present invention.
Figure 14:
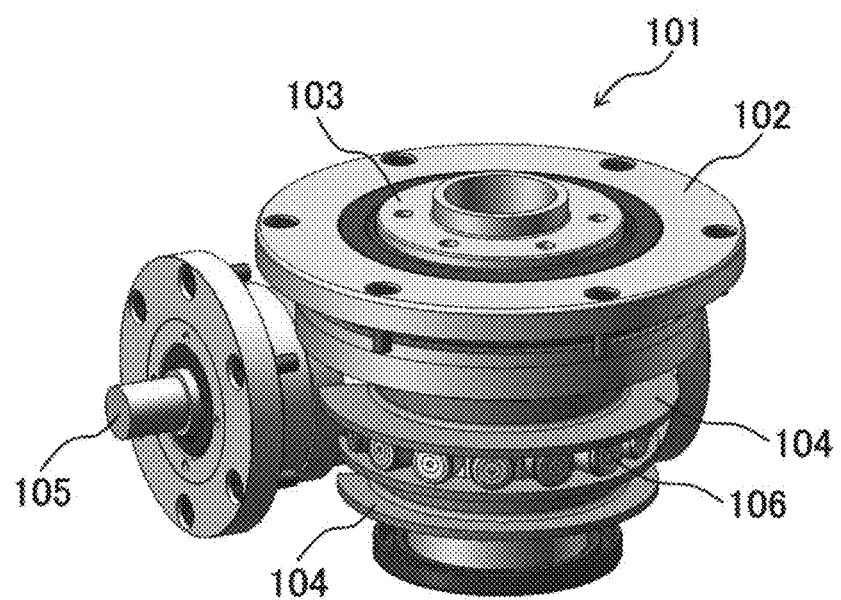
FIG. 14 is a perspective view showing the inside of a transmission mechanism as another embodiment of the present invention.
Figure 15:
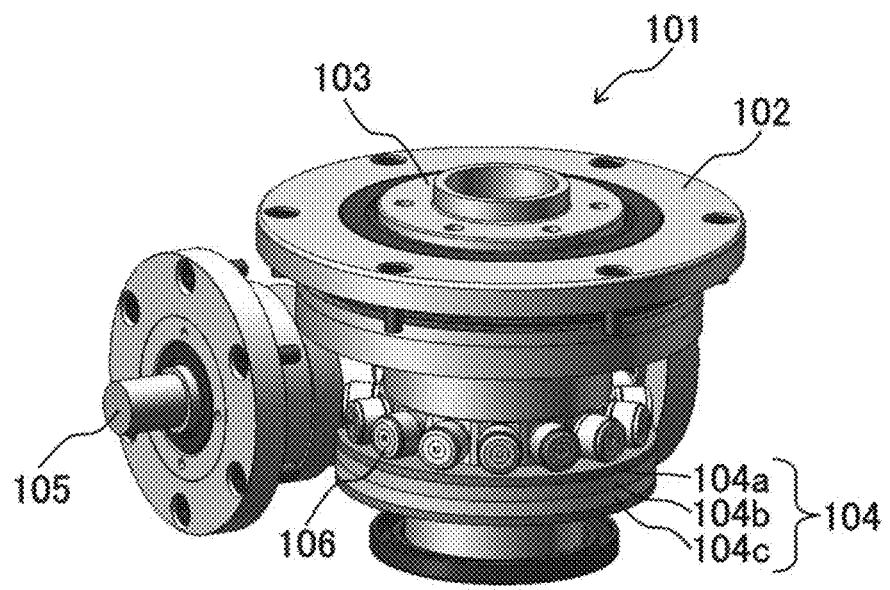
FIG. 15 is a perspective view showing the inside of a transmission mechanism as another embodiment of the present invention.
Figure 16:
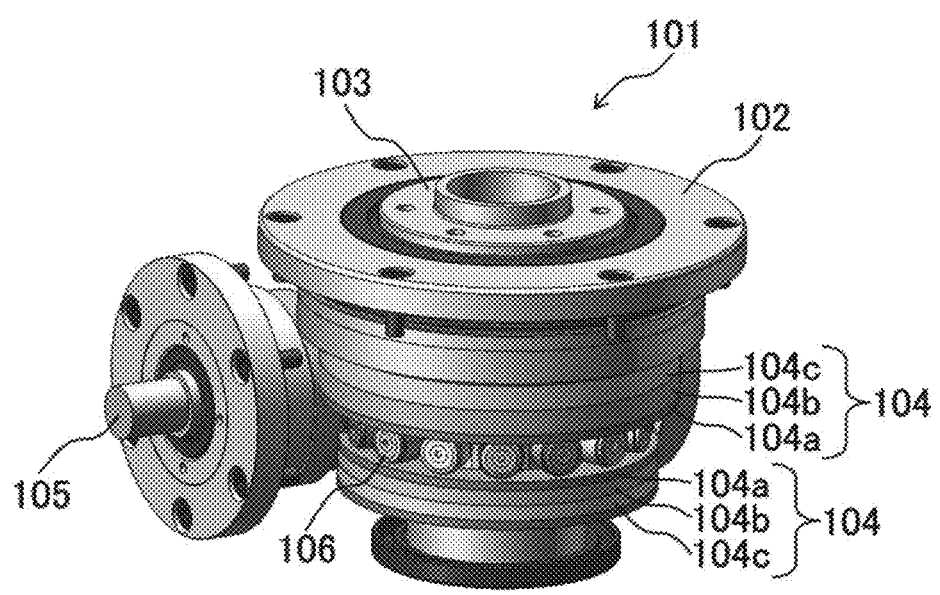
FIG. 16 is a perspective view showing the inside of a transmission mechanism as another embodiment of the present invention.
Figure 17:
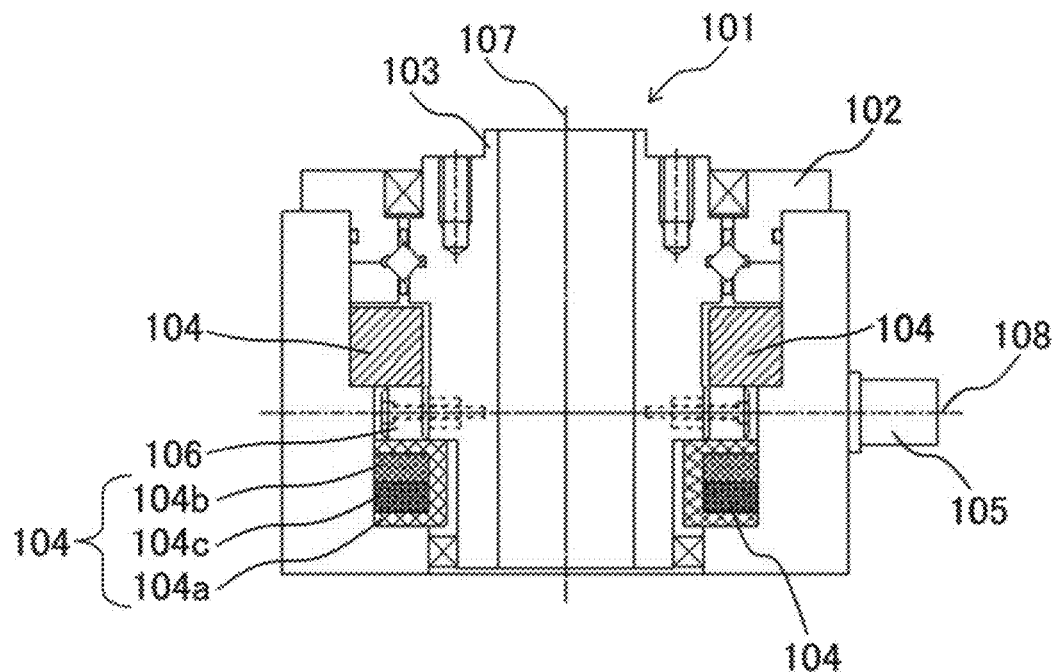
FIG. 17 is a perspective view showing the inside of a transmission mechanism as another embodiment of the present invention.
Figure 18:
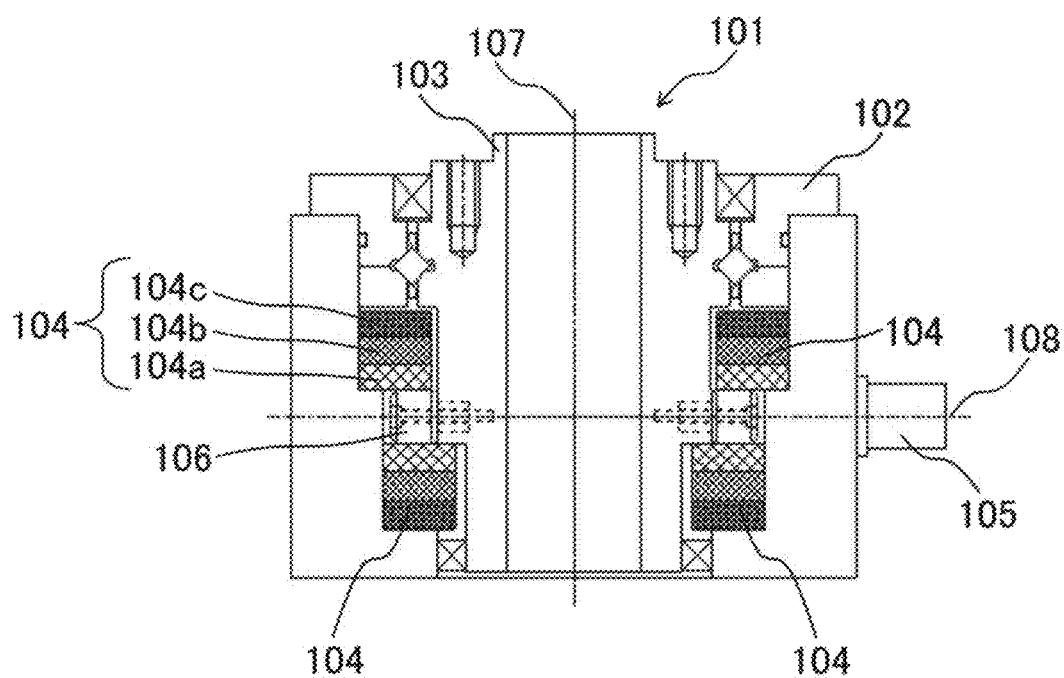
FIG. 18 is a perspective view showing the inside of a transmission mechanism as another embodiment of the present invention.
Figure 19:
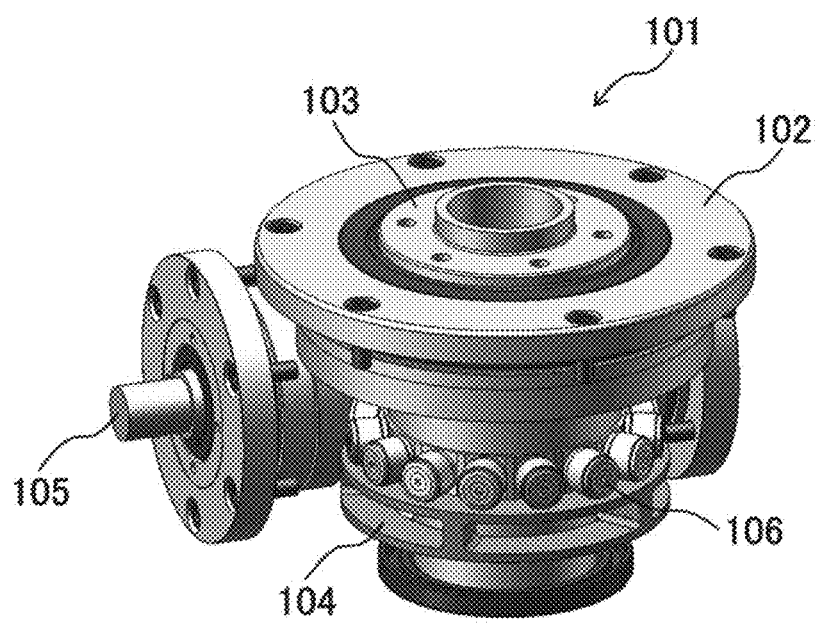
FIG. 19 is a perspective view showing the inside of a transmission mechanism as another embodiment of the present invention.
Figure 20:
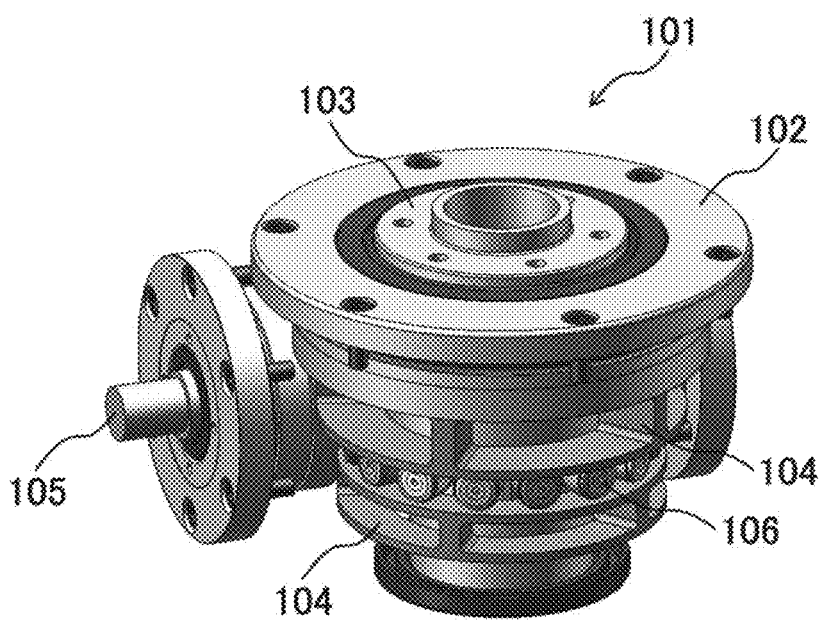
FIG. 20 is a perspective view showing the inside of a transmission mechanism as another embodiment of the present invention.
Figure 21:
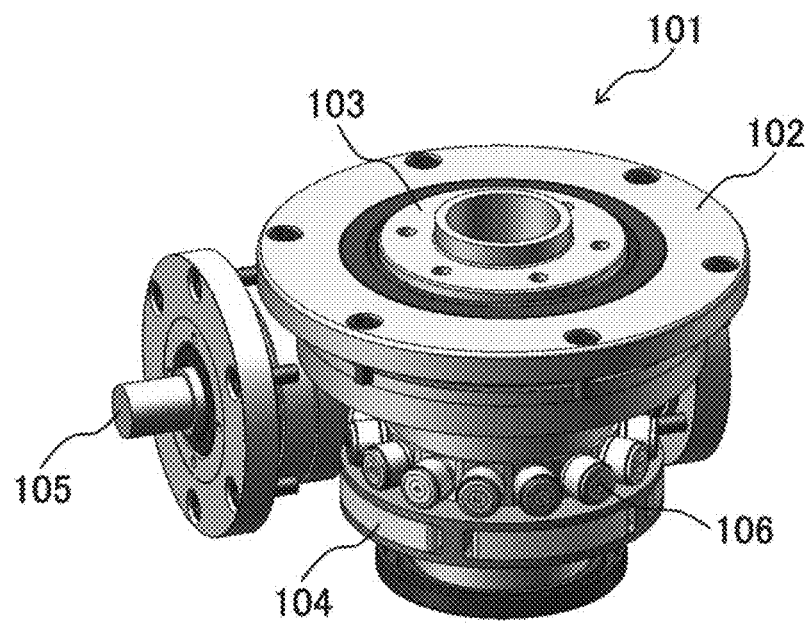
FIG. 21 is a perspective view showing the inside of a transmission mechanism as another embodiment of the present invention.
Figure 22:
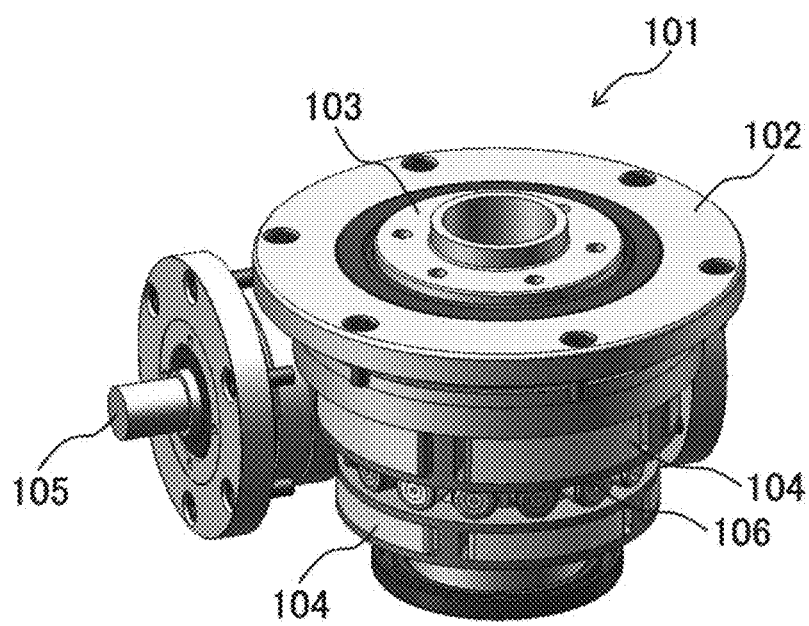
FIG. 22 is a perspective view showing the inside of a transmission mechanism as another embodiment of the present invention.

FIGS. 13 and 14 show transmission mechanisms 101 including a lubricating member(s) 104 having a substantially U-shaped cross-section shown in (a) of FIG. 12. The transmission mechanism 101 of FIG. 13 includes the lubricating member 104 only below the bearings 106, and the transmission mechanism 101 of FIG. 14 includes the lubricating members 104 below and above the bearings 106. FIGS. 15 and 16 show transmission mechanisms 101 including the multilayered type lubricating member(s) 104 shown in (f) of FIG. 12. The transmission mechanism 101 of FIG. 15 includes the lubricating member 104 only below the bearings 106, and the transmission mechanism 101 of FIG. 16 includes the lubricating members 104 below and above the bearings 106. The lubricating member 104 has a first layer 104a for adsorbing dust having large particle sizes at a portion close to the bearings 106, a second layer 104b for adsorbing dust having intermediate particle sizes at an intermediate portion from the bearings 106, and a third layer 104c for adsorbing dust having small particle sizes at a portion far from the bearings 106. FIG. 17 shows a transmission mechanism 101 including a substantially rectangular integrated type lubricating member 104 shown in (c) of FIG. 12, and a multilayered type lubricating member 104 shown in (f) of FIG. 12. In the lubricating member 104, the second layer 104b for adsorbing dust having intermediate particle sizes and the third layer 104c for adsorbing dust having small particle sizes are arranged in the substantially U-shaped cavity of the first layer 104a which has a substantially U-shaped cross-section as shown in (a) of FIG. 12 and adsorbs dust having large particle sizes. Although the transmission mechanism 101 of FIG. 17 includes the integrated type lubricating member 104 on the upper side and the multilayered type lubricating member 104 on the lower side, the transmission mechanism 101 may include the multilayered type lubricating member 104 on the upper side and the integrated type lubricating member 104 on the lower side. FIG. 18 shows a transmission mechanism 101 including a multilayered type lubricating member 104. The lubricating member 104 includes a lamination of a first layer 104a for adsorbing dust having large particle sizes, a second layer 104b for adsorbing dust having intermediate particle sizes, and a third layer 104c for adsorbing dust having small particle sizes. It is not necessary that all of the first layer 104a, the second layer 104b, and the third layer 104c are layers for adsorbing dust. For example, the first layer 104a, the second layer 104b and the third layer 104c may be layers having different properties such that the first layer 104a is a layer containing lubricant, the second layer 104b is a layer for adsorbing dust and the third layer 104c is a layer for transferring heat, or the like, and the properties of the layers may be selected as needed. FIGS. 19 and 20 show transmission mechanisms 101 including a lubricating member(s) 104 having a shape in which a reinforcing portion having a substantially U-shaped cross-section shown in (b) of FIG. 12 is added. The transmission mechanism 101 of FIG. 19 includes the lubricating member 104 only below the bearings 106, and the transmission mechanism 101 of FIG. 20 includes the lubricating members 104 below and above the bearings 106. FIGS. 21 and 22 show transmission mechanisms 101 including a lubricating member(s) 104 obtained by modifying the shape in which a reinforcing portion having a substantially U-shaped cross-section as shown in (b) of FIG. 12 is added. The transmission mechanism 101 of FIG. 21 includes the lubricating member 104 only below the bearings 106, and the transmission mechanism 101 of FIG. 22 includes the lubricating members 104 below and above the bearings 106. In the lubricating member 104, a member having properties (for example, elastic force, absorbency for lubricant, pumping action, cooling action, cleaning action, etc.) different from those of the lubricating member having the shape in which the reinforcing portion having the substantially U-shaped cross-section as shown in (b) of FIG. 12 is added is arranged in a substantially U-shaped cavity of the shape in which the reinforcing portion having the substantially U-shaped cross-section as shown in (b) of FIG. 12 is added.

Figure 23:
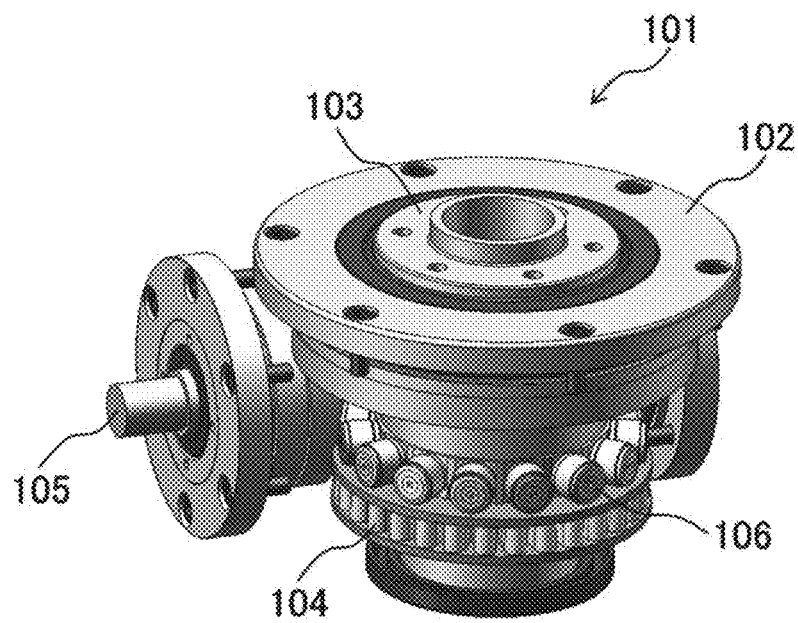
FIG. 23 is a perspective view showing the inside of a transmission mechanism as another embodiment of the present invention
Figure 24:
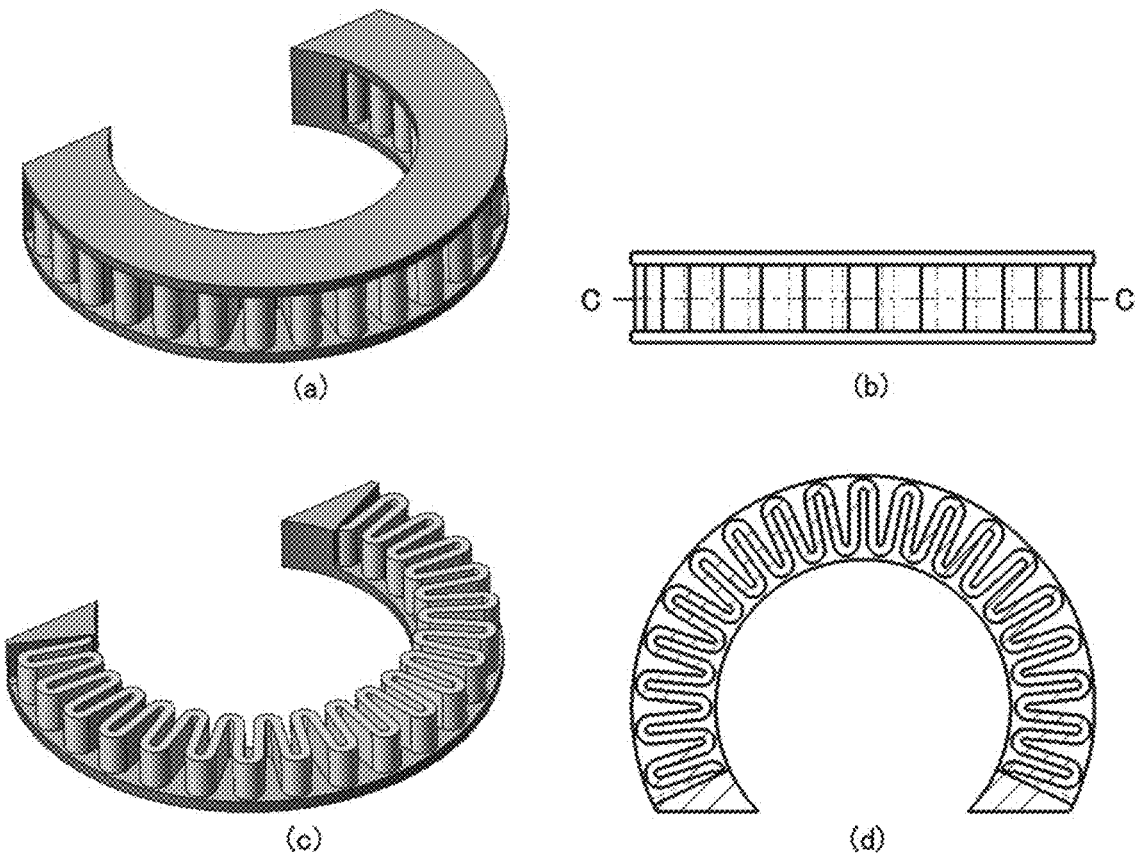
FIG. 24 is a diagram showing a lubricating member of the transmission mechanism of FIG. 23.
Figure 25:
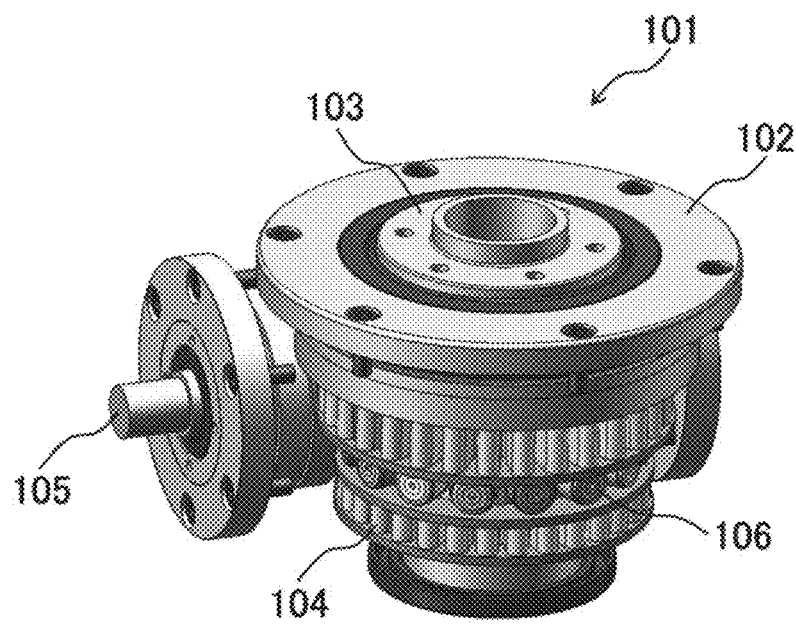
FIG. 25 is a perspective view showing the inside of a transmission mechanism as another embodiment of the present invention.

FIG. 23 shows a transmission mechanism 101 including a lubricating member 104 of FIG. 24 below the bearings 106. In the lubricating member 104 of FIG. 24 ((a) is a perspective view, (b) is a side view, (c) is a perspective view of a cross-section taken along line C-C of (b), and (d) is a cross-sectional view taken along the line C-C), a depth-pleated type (radial flow type) as shown in (e) of FIG. 12) is arranged in a substantially U-shaped cavity of a shape having a substantially U-shaped cross-section as shown in (a) of FIG. 12. Further, FIG. 25 shows a transmission mechanism 101 including the lubricating members 104 of FIG. 24 below and above the bearings 106. As described above, by adopting the lubricating member 104 in which the various shapes of FIG. 12 are combined, the transmission mechanism 101 can include the lubricating members 104 having various properties (for example, elastic force, absorbency for lubricant, pumping action, cooling action, cleaning action and the like).

Figure 26:
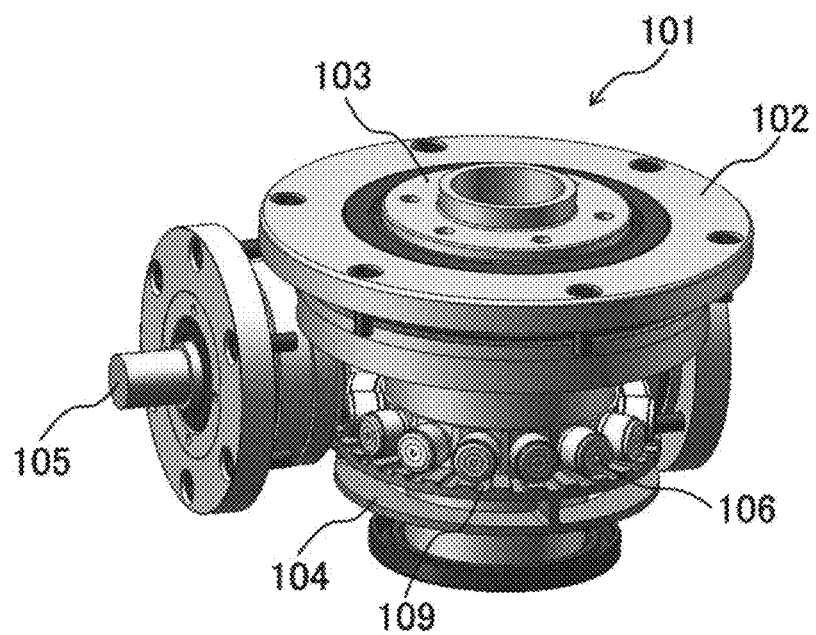
FIG. 26 is a perspective view showing the inside of a transmission mechanism as another embodiment of the present invention.
Figure 27:
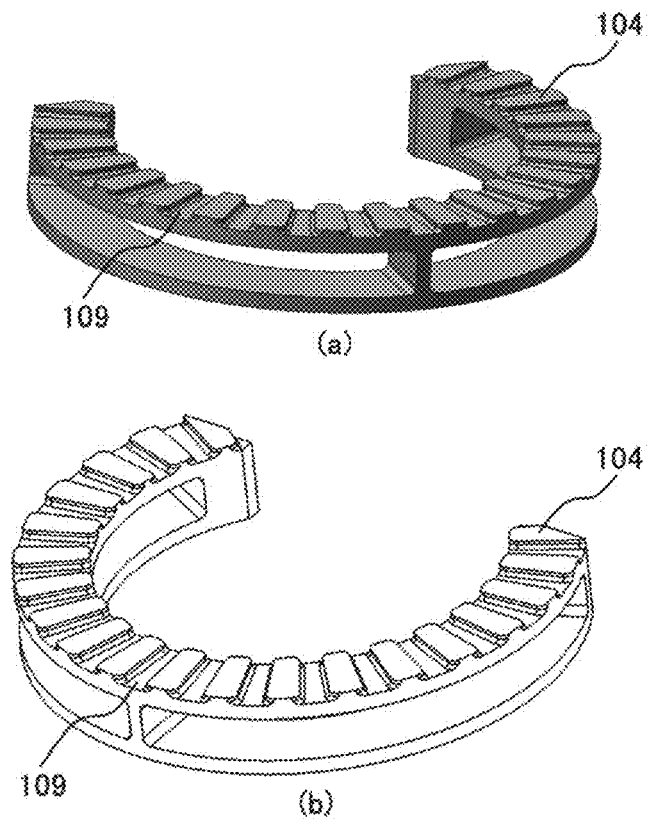
FIG. 27 is a perspective view showing a lubricating member of the transmission mechanism of FIG. 26.
Figure 28:
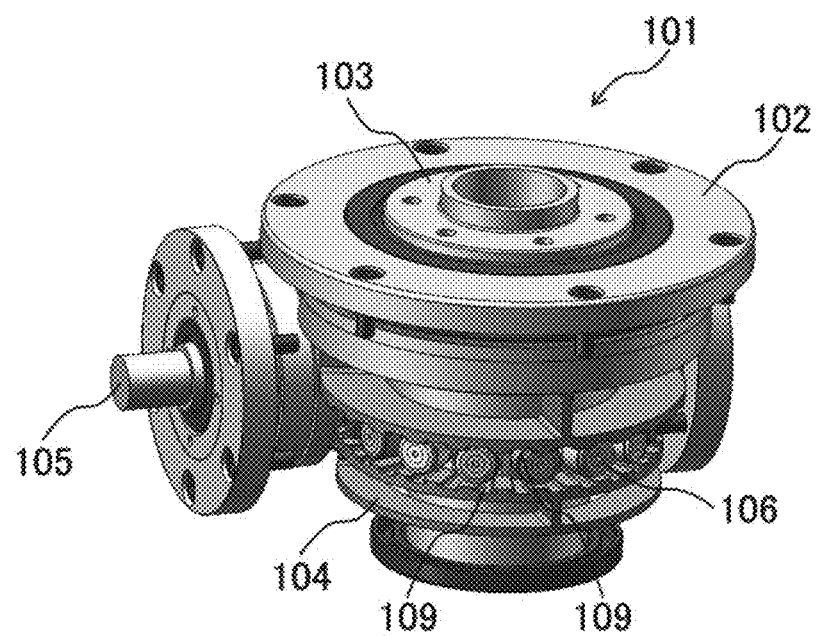
FIG. 28 is a perspective view showing the inside of a transmission mechanism as another embodiment of the present invention.
Figure 29:
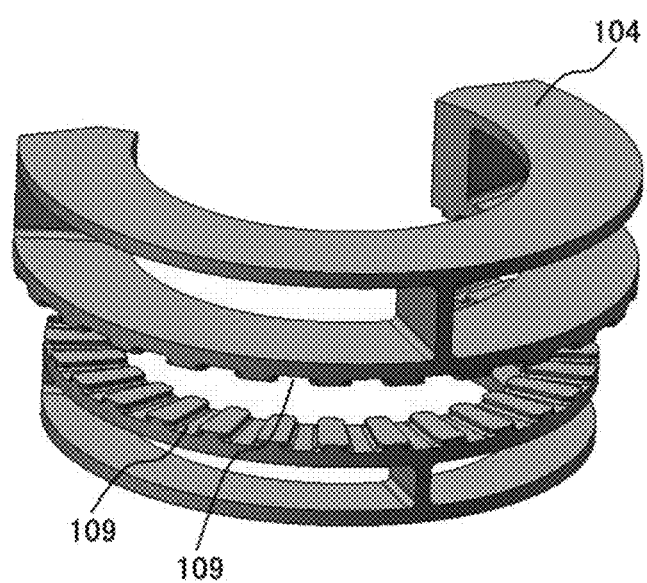
FIG. 29 is a perspective view showing a lubricating member of the transmission mechanism of FIG. 28.

FIG. 26 shows a transmission mechanism 101 including a lubricating member 104 of FIG. 27 below the bearings 106. The lubricating member 104 shown in FIG. 27 ((a) and (b) are perspective views taken from different angles) has a shape in which a reinforcing portion having a substantially U-shaped cross-section as shown in (b) of FIG. 12 is added, and is provided with at least one groove 109 on the contact surface of the lubricating member 104 with the bearings 106. The groove 109 enables the lubricating member 104 to change a preload to be applied to the bearings 106 being in no contact with the second rotating member 105 based on an elastic force and accumulate dust in the groove 109 while the bearings 106 rotate about the first rotating member axis 107 with respect to the lubricating member 104, so that the groove 109 can enhance the cleaning action against the dust in the lubricating member 104. The groove 109 may be provided in the lubricating members 104 having various shapes as shown in FIG. 12. FIG. 28 shows a transmission mechanism 101 including a lubricating member 104 of FIG. 29. By arranging the lubricating members 104 above and below the bearings 106, the cleaning action against dust in the lubricating member 104 can be further enhanced.

While a plurality of bearings 106 are in contact with the lubricating member 104, gaps are provided between a main body portion of the first rotating member 103, that is, a portion of the first rotating member 103 excluding the plurality of bearings 106 and the lubricating member 104. Since the main body portion of the first rotating member 103 is in no contact with the lubricating member 104 due to the gaps, so that it is possible to suppress friction caused by the contact between the main body portion of the first rotating member 103 and the lubricating member 104. The lubricating member 104 may be accommodated in the housing 102 before the bearings 106 are attached to the first rotating member 103.

Each bearing 106 may include an inner ring portion, and a substantially cylindrical outer ring portion that is rotatable around the inner ring portion along the side surface of the inner ring portion. The lubricating member 104 comes into contact with the bearings 106 passing across the lubricating member 104 with the outer ring portions rotating around the inner ring portions while applying a preload based on an elastic force, whereby the lubricant is coated on the outer ring portions of the bearings 106 to lubricate the outer ring portions of the bearings 106. When the bearings 106 come into contact with the second rotating member 105 due to the rotation of the bearings 106 about the first rotating member axis 107, the outer ring portions of the bearings 106 rotate around the inner ring portions while coming into rolling contact with the second rotating member 105 to lubricate the contact portions between the second rotating member 105 and the outer ring portions of the bearings 106 with the lubricant, so that it is possible to suppress abrasion caused by the contact between the second rotating member 105 and the outer ring portions of the bearings 106. Each bearing 106 may be a rolling-contact bearing having a rolling element such as a roller or a needle between the inner ring portion and the outer ring portion, or a sliding-contact bearing including no rolling element.

Each bearing 106 may be a cam follower including a fixing member for fixing each bearing 106 to the first rotating member 103 inside the inner ring portion, and the fixing member is fitted into the main body portion of the first rotating member 103, whereby each bearing 106 is fixed to the first rotating member 103 so that the outer ring portion is rotatable. Further, each bearing 106 may be a roller follower including no fixing member, and a fixing member as a member separate from the bearing 106 is penetrated through the inside of the inner ring portion, and fitted into the main body portion of the first rotating member 103, whereby each bearing 106 is fixed to the first rotating member 103 so that the outer ring portion is rotatable. The second rotating member 105 has a shape that can engage with the cam follower or the roller follower. Further, each bearing 106 may be a ball. The ball may be engaged with the main body portion of the first rotating member 103, and the lubricating member 104 may come into contact with the ball while applying a preload to the ball based on an elastic force so as to press the ball against the first rotating member 103, whereby lubricant is coated on the ball to lubricate the ball with the lubricant. The second rotating member 105 has a shape that can engage with the ball.

The second rotating member 105 may be a cam which has a cam rib and engages with the bearing 106. Either of the first rotating member 103 and the second rotating member 105 may be an input shaft or an output shaft. The shape of the cam may be a shape having a screw-shaped cam rib. For example, when the second rotating member 105 rotates about the second rotating member axis 108 as an input axis, a plurality of bearings 106 sequentially come into contact with the cam rib one after another so that the first rotating member 103 can rotate as an output shaft about the first rotating member axis 107 orthogonal to the second rotating member axis 108. While the bearings 106 are rotating about the first rotating member axis 107 with respect to the lubricating member 104, the lubricating member 104 comes into contact with the bearings 106 passing across the lubricating member 104 while applying a preload based on an elastic force, whereby lubricant is coated on the outer surfaces of the bearings 106 to lubricate the bearings 106 with the lubricant. When the bearings 106 lubricated with the lubricant while the bearings 106 have not been in contact with the second rotating member 105 start to come into contact with the cam rib of the second rotating member 105 due to the rotation of the first rotating member 103 about the first rotating member axis 107, whereby it is possible to suppress abrasion caused by the contact between the cam rib and the bearings 106. Further, when the bearings 106 are in rolling contact with the cam rib, it is possible to enhance the transmission efficiency of a torque input from the first rotating member 103 or the second rotating member 105 as the input shaft to the second rotating member 105 or the first rotating member 103 as the output shaft, and also extend the life of the transmission mechanism 101. Further, since each of the bearings 106 and the cam rib are in line contact with each other, they have high rigidity for an external force in the rotation direction of the first rotating member 103. Depending on the shape of the cam, the plurality of bearings 106 may be radially attached to the outer peripheral surface of the main body portion of the first rotating member 103 having a substantially cylindrical shape, or may be circularly attached to the end surface of the main body portion of the first rotating member 103 having a substantially cylindrical shape.

The lubricating member 104 may be any member as long as the member lubricates a part of the first rotating member 103 with lubricant while the first rotating member 103 rotates about the first rotating member axis 107 with respect to the lubricating member 104, and the transmission mechanism 101 including the lubricating member 104 accommodated in the housing 102 may be a cam mechanism including, as the second rotating member 105, a cam with a cam rib having various screw-like shapes such as a hand-drum type cam (roller gear cam, concave globoidal cam), a tube-shaped cam (cylindrical cam, barrel cam), and a drum type cam (convex globoidal cam). Further, the transmission mechanism 101 may be a ball reducer, a worm reducer, a planetary gear reducer, a wave gear reducer, a traction drive reducer, or the like.

Further, the transmission mechanism 101 may be a circumscribed type in which the first rotating member 103 and the second rotating member 105 are in such a positional relationship that they come into contact with each other within the width of a line connecting the first rotating member axis 107 and the second rotating member axis 108, or an inscribed type in which the first rotating member 103 and the second rotating member 105 are in such a positional relationship that they come into contact with each other out of the width of the line connecting the first rotating member axis 107 and the second rotating member axis 108. The inscribed type includes an inscribed parallel cam mechanism, an inscribed trochoid gear mechanism, and the like.

It should be further understood by persons skilled in the art that although the foregoing description has been made on embodiments of the present invention, the present invention is not limited thereto and various changes and modifications may be made without departing from the principle of the present invention and the scope of the appended claims.

The invention claimed is:

1. A transmission mechanism comprising a housing, and a first rotating member that is accommodated in the housing and is rotatable about a first rotating member axis, the transmission mechanism further comprising a lubricating member that is accommodated in the housing and contains lubricant, wherein the lubricating member comes into contact with a part of the first rotating member while applying a preload based on an elastic force during rotation of the first rotating member with respect to the lubricating member, thereby lubricating the part of the first rotating member with the lubricant, and the lubricating member adsorbs dust from the first rotating member by contact with the first rotating member and adsorbs dust of which a particle size decreases according to a distance from a contact portion thereof with the first rotating member.

2. The transmission mechanism according to claim 1, wherein the lubricating member comprises an absorbent member impregnated with the lubricant.

3. The transmission mechanism according to claim 1, wherein the lubricating member comprises an elastic material, and applies the preload to the part of the first rotating member based on the elastic force of the elastic material.

4. The transmission mechanism according to claim 1, further comprising an elastic member, wherein the elastic member presses the lubricating member against the part of the first rotating member based on the elastic force, whereby the lubricating member applies the preload to the part of the first rotating member.

5. The transmission mechanism according to claim 1, wherein the lubricating member deforms by coming into contact with the part of the first rotating member while applying the preload to circulate the lubricant in the lubricating member.

6. The transmission mechanism according to claim 1, wherein the lubricating member absorbs heat from the first rotating member by contact with the first rotating member, and transfers the heat to the housing.

7. The transmission mechanism according to claim 1, wherein at least one groove is provided at the contact portion of the lubricating member with the first rotating member.

8. The transmission mechanism according to claim 1, wherein the lubricating member is detachable from the housing.

9. The transmission mechanism according to claim 1, further comprising a second rotating member that is rotatable about a second rotating member axis, wherein rotation of one of the first rotating member and the second rotating member enables rotation of the other of the first rotating member and the second rotating member by contact between the first rotating member and the second rotating member, and in order to lubricate contact portions of the first rotating member and the second rotating member with the lubricant during rotation of the first rotating member and the second rotating member, when the part of the first rotating member is not in contact with the second rotating member, the lubricating member comes into contact with the part of the first rotating member while applying the preload based on the elastic force, thereby lubricating the part of the first rotating member with the lubricant.

10. The transmission mechanism according to claim 9, wherein the first rotating member comprises a plurality of bearings along a rotation direction thereof, and the lubricating member comes into contact with at least one bearing, of the plurality of bearings, being in no contact with the second rotating member while applying the preload based on the elastic force, thereby lubricating the at least one bearing being in no contact with the second rotating member with the lubricant.

11. The transmission mechanism according to claim 10, wherein the elastic force is elastic forces in two directions, thereby the preload is preloads in two directions, wherein the lubricating member comes into contact with the at least one bearing being in no contact with the second rotating member while applying the preloads based on the elastic forces, thereby lubricating the at least one bearing being in no contact with the second rotating member with the lubricant.

12. The transmission mechanism according to claim 10, wherein a portion of the first rotating member excluding the plurality of bearings does not come into contact with the lubricating member.

13. The transmission mechanism according claim 10, wherein each of the plurality of bearings is a cam follower, a roller follower, or a ball, and the second rotating member has a shape that can engage with each of the plurality of bearings.

\* \* \* \* \*